Figure 1:
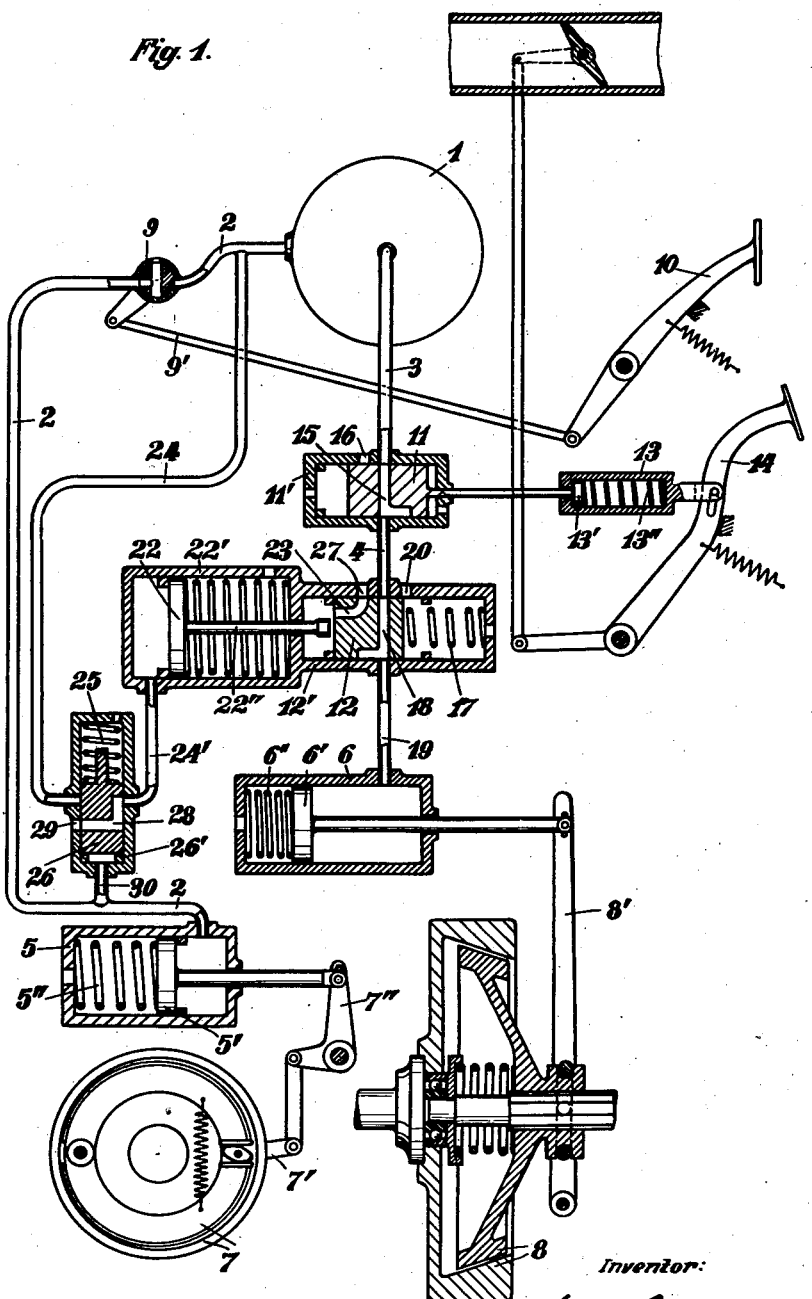

Dec. 29, 1936.　　　K. MAYBACH　　　2,065,980
CLUTCH AND BRAKE DEVICE FOR MOTOR VEHICLES
Filed Aug. 8, 1934　　　3 Sheets-Sheet 1

Inventor:
Karl Maybach

Dec. 29, 1936.    K. MAYBACH    2,065,980
CLUTCH AND BRAKE DEVICE FOR MOTOR VEHICLES
Filed Aug. 8, 1934    3 Sheets-Sheet 2

Inventor:
Karl Maybach

Dec. 29, 1936.  K. MAYBACH  2,065,980
CLUTCH AND BRAKE DEVICE FOR MOTOR VEHICLES
Filed Aug. 8, 1934  3 Sheets-Sheet 3

Inventor:
Karl Maybach

Patented Dec. 29, 1936

2,065,980

UNITED STATES PATENT OFFICE 2,065,980

CLUTCH AND BRAKE DEVICE FOR MOTOR VEHICLES

Karl Maybach, Friedrichshafen, Germany, assignor to Maybach-Motorenbau G. m. b. H., Friedrichshafen, Bodensee, Germany Application August 8, 1934, Serial No. 738,900
In Germany August 17, 1933

9 Claims. (Cl. 192—.01)

My invention relates to clutch and brake devices of motor vehicles and has special reference to so-called free-wheeling clutches which are provided on motor cars for the purpose of allowing temporary running of the car without the wheels being in driving connection with the motor. This may be performed by providing a special free-wheeling clutch between the motor and the propeller shaft or means may be provided for allowing the normal friction clutch between the motor and the change speed gear to be used for this purpose.

Frequently such a clutch mechanism is so connected to the gas lever that automatically the clutch is disconnected when the driver releases the gas lever and that, again automatically, reclutching is performed on giving gas again.

If the driver is free-wheeling and for some reason or other wants to apply the brakes this braking is not so effective as under normal conditions, the braking effect from the motor is eliminated as the driving connection between the wheels and the motor is interrupted. That is why means may be provided for automatically re-engaging the free-wheeling clutch at the moment the brakes are operated.

Devices of this kind have been designed but they have the very disagreeable feature that as soon as the brakes are released again the vehicle returns automatically to the former free-wheeling conditions.

According to my invention I avoid this drawback by providing mechanical, electric, hydraulic or pneumatic (pressure gas or vacuum) means which cause the clutch to stay engaged after braking until the gas pedal has been depressed and released again. This means that after the brakes having been applied the car comes back to normal driving conditions, so that free-wheeling can be effected in the normal way by releasing the gas pedal after having given gas again.

This is a great advantage, because when the brakes are applied in the free-wheeling state the driver wants to come back to normal driving conditions afterwards, so that he is not obliged to give gas again for the purpose of re-engaging the clutch. Generally, when he has applied the brakes he gradually reduces the braking effect by releasing the brake pedal so that finally the motor alone continues to cause a certain braking effect. When braking in the free-wheeling state this procedure is impossible without providing means according to my invention.

There are other objects of my invention besides. All of them will be understood best when having reference to the drawings which represent an example embodying my invention.

The figures are mere diagrams and show the main parts in cross section.

In Fig. 1 the conditions and positions of the individual parts are shown when the gas pedal and the brake pedal are released so that free-wheeling conditions prevail.

Figure 2:
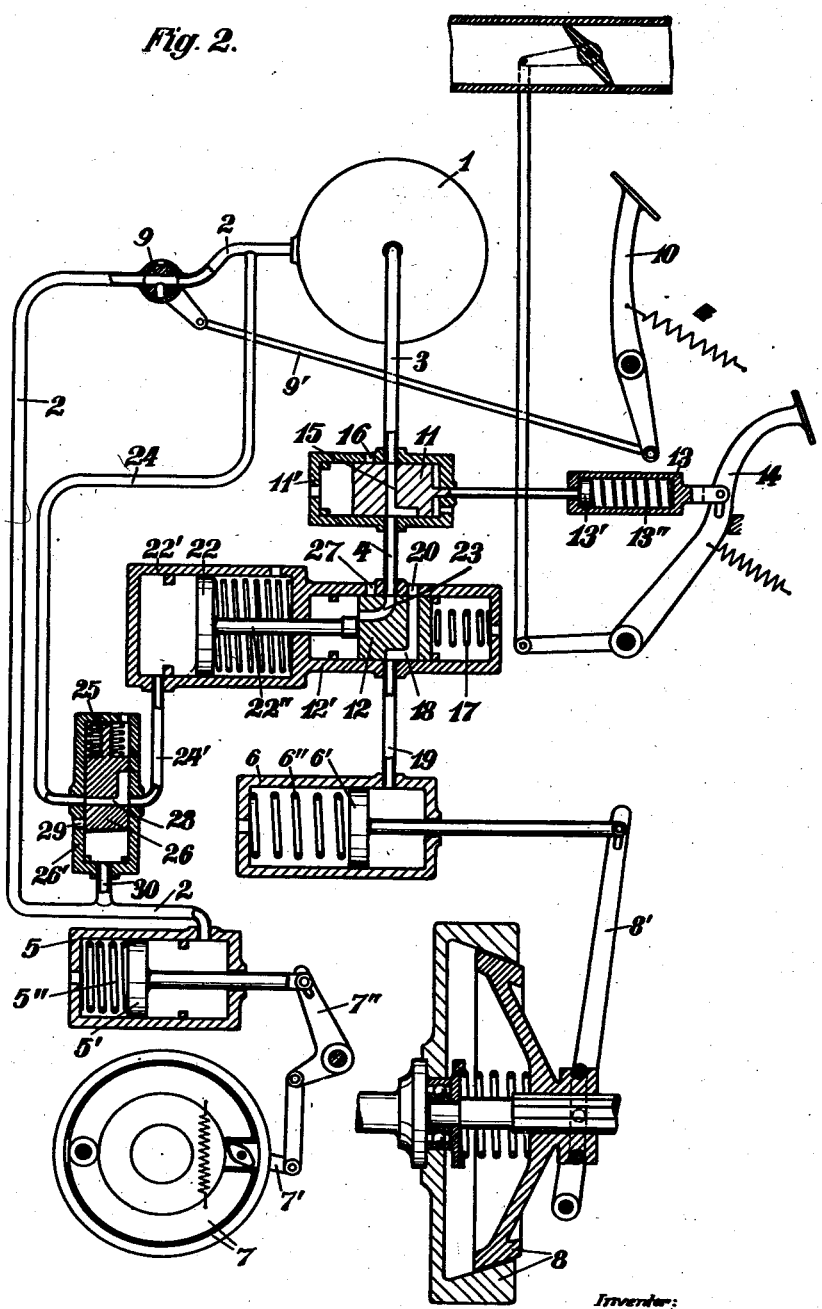

Fig. 2 is analogous to Fig. 1 except that the positions are shown with depressed brake lever.

Fig. 3, again, corresponds to Fig. 1, only with the difference that the gas pedal is depressed so that some parts are shifted into other positions.

There is a container 1 with compressed air or the like from which pipe line 2 leads to cylinder 5 and pipe lines 3, 4, 19 through valves 11 and 12 to cylinder 6. In cylinder 5 piston 5' may be moved by pressure gas against the pressure of spring 5" thereby operating brake 7 by means of levers 7' and 7"; whereas pressure gas in cylinder 6 causes piston 6' to move against the pressure of spring 6" thereby operating clutch 8 by means of lever 8'.

There is a cock or valve 9 in pipe line 2 adapted to connect cylinder 5 with container 1 or with the atmosphere, subject to the position of brake pedal 10 which acts on cock 9 by means of rod 9'. Valve 11 situated within cylinder 11' has channel 15 adapted to cause connection between pipe lines 3 and 4 or between pipe line 4 and the atmosphere by means of hole 16, alternately. It is connected to piston 13' sliding inside of cylinder 13, spring 13" acting on the piston 13'. Cylinder 13 is in connection with gas pedal 14.

Valve 12 moves within cylinder 12' and on one side it is under the pressure of spring 17 and on its other side it is adapted to be moved by piston rod 22" belonging to piston 22 within cylinder 22'. Valve 12 has two channels, one of them, channel 18, connects pipe line 19 to pipe line 4 or to opening 20, alternately, whereas channel 23 is adapted to connect the cylinder space to the left of valve 12 alternately to opening 21 or to pipe line 4.

Piston 22 in its position is subject to the pressure means entering through pipe line 24' and controlled by valve 26. This valve slides inside of cylinder 26' and on one side it is under the pressure of spring 25 and on its other side under the pressure of the pressure gas entering through pipe line 30 which is regulated by cock 9. Valve 26 has a channel 28 adapted to connect pipe lines 24 and 24' with each other or to connect pipe line 24' to the atmosphere by means of opening 29, alternately.

Figure 3:
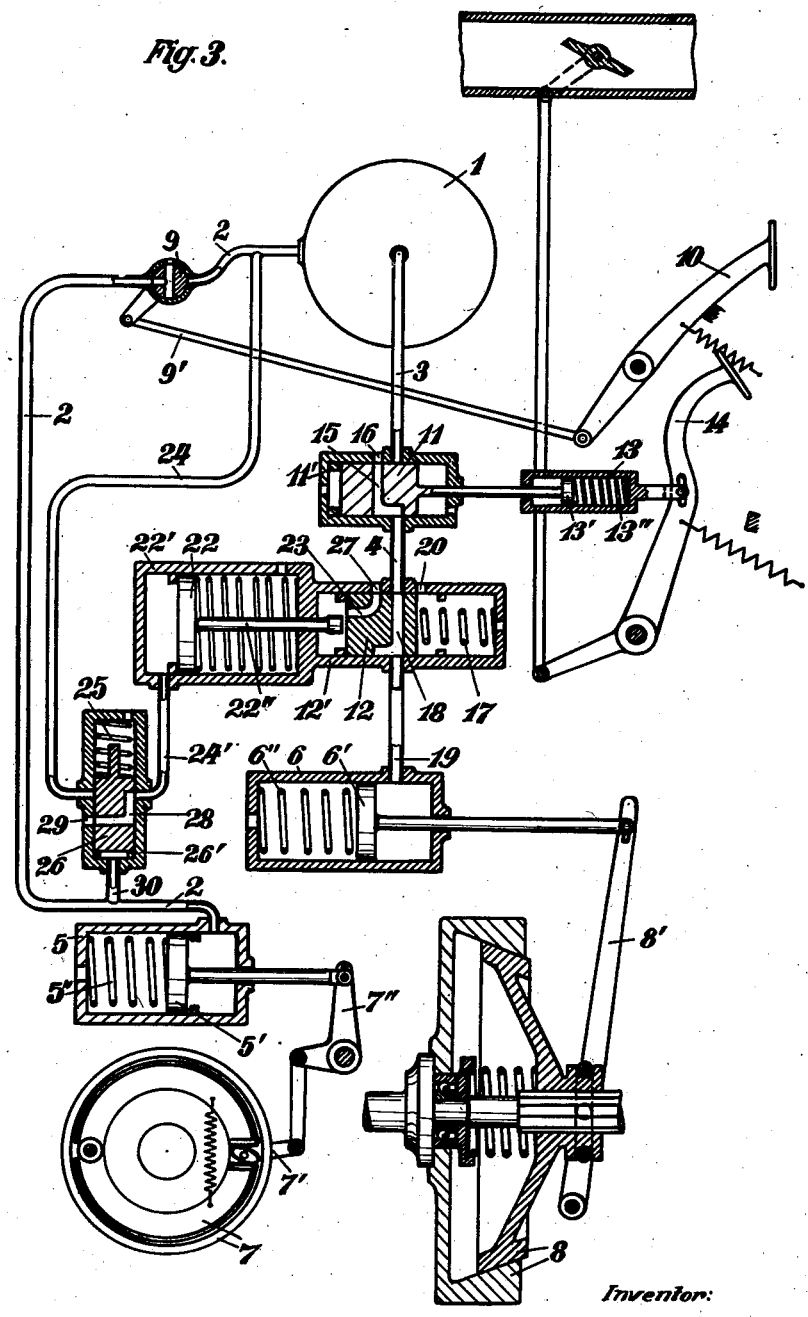

The operation of the arrangement is as follows:

If the driver of the motor car rides under normal conditions giving gas in accordance to the circumstances prevailing, the parts of the mechanism are in the positions represented in Fig. 3: gas lever 14 is depressed, valve 11 is in its left hand position thereby connecting pipe 4 to the atmosphere, clutch 8 is in engagement, and brake 7 is released.

When the driver wants free-wheeling, he removes his foot from the gas pedal 14 so that it returns to its released position, as shown in Fig. 1. Valve 11 is moved to its right hand position so that now channel 15 connects pipe line 3 to pipe line 4 which means that pressure gas enters into cylinder 6 and moves piston 6' to the left thereby disconnecting clutch 8.

If now the driver is obliged to reduce the speed, perhaps because of coming to a steep slope, or for some other reason, he depresses the brake pedal 10 and thereby causes the parts to come to the positions represented in Fig. 2: cock 9 is turned on so as to allow the pressure gas from container 1 to enter cylinder 5 and to move piston 5' to the left thereby causing engagement of brake 7. When the pressure of the pressure gas exceeds a certain limit given by the force of spring 25, it pushes valve 26 upward so that channel 28 connects pipe lines 24 and 24' thereby allowing the pressure gas to enter cylinder 22' and to push piston 22 into its right hand position; piston 22 pushes valve 12 into its right hand position so that pipe line 19 and cylinder 6 are connected to the atmosphere causing piston 6' to move into its right hand position thereby bringing clutch 8 to engagement. At the same time channel 23 of valve 12 connects pipe lines 3 and 4 to the cylinder space to the left of valve 12, which means that pressure gas is now acting directly on the left side of valve 12 so that turning off of cock 9 and thereby causing disengagement of the brake 7 and return movement of piston 22 into its left hand position does not cause valve 12 to return to its left hand position also. If the brake lever 10 is released again the brake is disengaged but valve 12 being held in its right position causes clutch 8 to stay engaged so that the connection to the motor is still effective. Depressing the gas pedal 14 causes movement of valve 11 to the left into the position shown in Fig. 3 in which pipe line 4 by means of channel 15 is connected to the atmosphere so that the pressure to the left of valve 12 (Fig. 2) vanishes and valve 12 moves to its left hand position also (Fig. 3). Consequently, the conditions are again the same as prevailing in the beginning, so that clutch 8 will be disengaged when gas pedal 14 is released.

I do not want to be limited to the details described or shown in the drawings as many variations will occur to those skilled in the art.

What I claim is:

1. In a motor vehicle a device of the type comprising: a clutch; a brake; means for operating said brake; means for controlling the fuel admission to the motor of said vehicle; means for automatically disconnecting said clutch on said fuel controlling means being shut off; means for automatically causing re-engagement of said clutch on said brake being operated; and means automatically becoming operative on said brake operating means being released to prevent redisengagement of said clutch.

2. In a motor vehicle a device of the type described comprising: a clutch; a brake; control means for the brake, control means for regulating the fuel admission to the motor of said vehicle; means for automatically disconnecting said clutch on said fuel control means being shut off; means for automatically causing engagement of said clutch on the setting of said brake, and control means responsive to other of the control means for automatically preventing redisengagement of said clutch on release of the brake control means.

3. In a motor vehicle a device of the type comprising: a clutch; a brake; means for operating said brake; means for controlling the fuel admission to the motor of said vehicle; means for automatically disconnecting said clutch on said fuel controlling means being shut off; means for automatically causing re-engagement of said clutch on said brake being operated; and means for automatically preventing redisengagement of said clutch on said brake operating means being released, said means being subject to control by the fuel controlling means.

4. In a motor vehicle a device of the type comprising: a clutch; a brake; means for operating said brake; means for controlling the fuel admission to the motor of said vehicle; means for automatically disconnecting said clutch on said fuel controlling means being shut off; means for automatically causing re-engagement of said clutch on said brake being operated; and means operative to cause the clutch to stay engaged during release of the brake and until the fuel controlling means has been opened and then becoming inoperative so as to permit the clutch to be disengaged upon the closing of the fuel controlling means.

5. In a motor vehicle a device of the type comprising: a clutch; a brake; means for operating said brake; means for controlling the fuel admission to the motor of said vehicle; means for automatically disconnecting said clutch on said fuel controlling means being shut off; means for automatically causing re-engagement of said clutch on said brake being operated; and means rendered operative by the brake operating means to cause the clutch to stay engaged on said brake operating means being released, said means which is rendered operative by the brake operating means being rendered inoperative to cause the clutch to stay engaged by the fuel controlling means so as to permit the clutch to be redisengaged as the fuel controlling means is closed.

6. In a motor vehicle a device of the type comprising: a clutch; a brake; means for operating said brake; means for controlling the fuel admission to the motor of said vehicle; means for automatically disconnecting said clutch on said fuel controlling means being shut off; means for automatically causing re-engagement of said clutch on said brake being operated; and automatic means operative during release of the braking means and remaining operative until after the opening of the fuel controlling means to cause the clutch to stay engaged, and then automatically becoming inoperative so that during the closing of the fuel controlling means so as the clutch can be disengaged.

7. In a motor vehicle a device of the type comprising: a clutch; a brake; first pressure means for operating said brake; means for controlling said pressure means; means for controlling the fuel admission to the motor of said vehicle; second pressure means for operating said clutch;

means for automatically controlling said second pressure means so as to cause disengagement of said clutch on said fuel controlling means being shut off; means in connection with both said pressure means adapted to cause automatically re-engagement of said clutch on said brake being operated; and means in connection with said second pressure means adapted to prevent automatically re-disengagement of said clutch on said brake being released.

8. On a motor driven vehicle in combination: a clutch; a brake; means for controlling the fuel admission to the motor of said vehicle; pressure means for operating said clutch and for operating said brake; said pressure means comprising a first liquid pressure system adapted to cause regulated pressure to act on said brake, a second liquid pressure system adapted to cause alternately full pressure and no pressure to act on said clutch and thereby to cause disengagement or engagement of said clutch; regulating means in said first system; control means in said second system connected to said fuel controlling means; a third liquid pressure system; control means in said third system adapted to be operated by the regulated pressure of said first system; second control means in said second system adapted to be operated by the pressure in said third system; and means in said second system for allowing its own pressure to act on said second control means in said second system.

9. In a motor vehicle a device of the type comprising: a clutch; a brake; means for operating said brake; means for controlling the fuel admission to the motor of said vehicle; pressure means for operating said clutch; means for automatically controlling said pressure means so as to cause disengagement of said clutch on said fuel controlling means from being shut off; means adapted to cause automatically re-engagement of said clutch on said brake being operated; and means dependent upon said pressure means adapted to prevent automatically re-disengagement of said clutch on said brake being released.

KARL MAYBACH.